ADJUSTABLE AUGER FEEDER
Filed Aug. 18, 1961
3 Sheets-Sheet 1
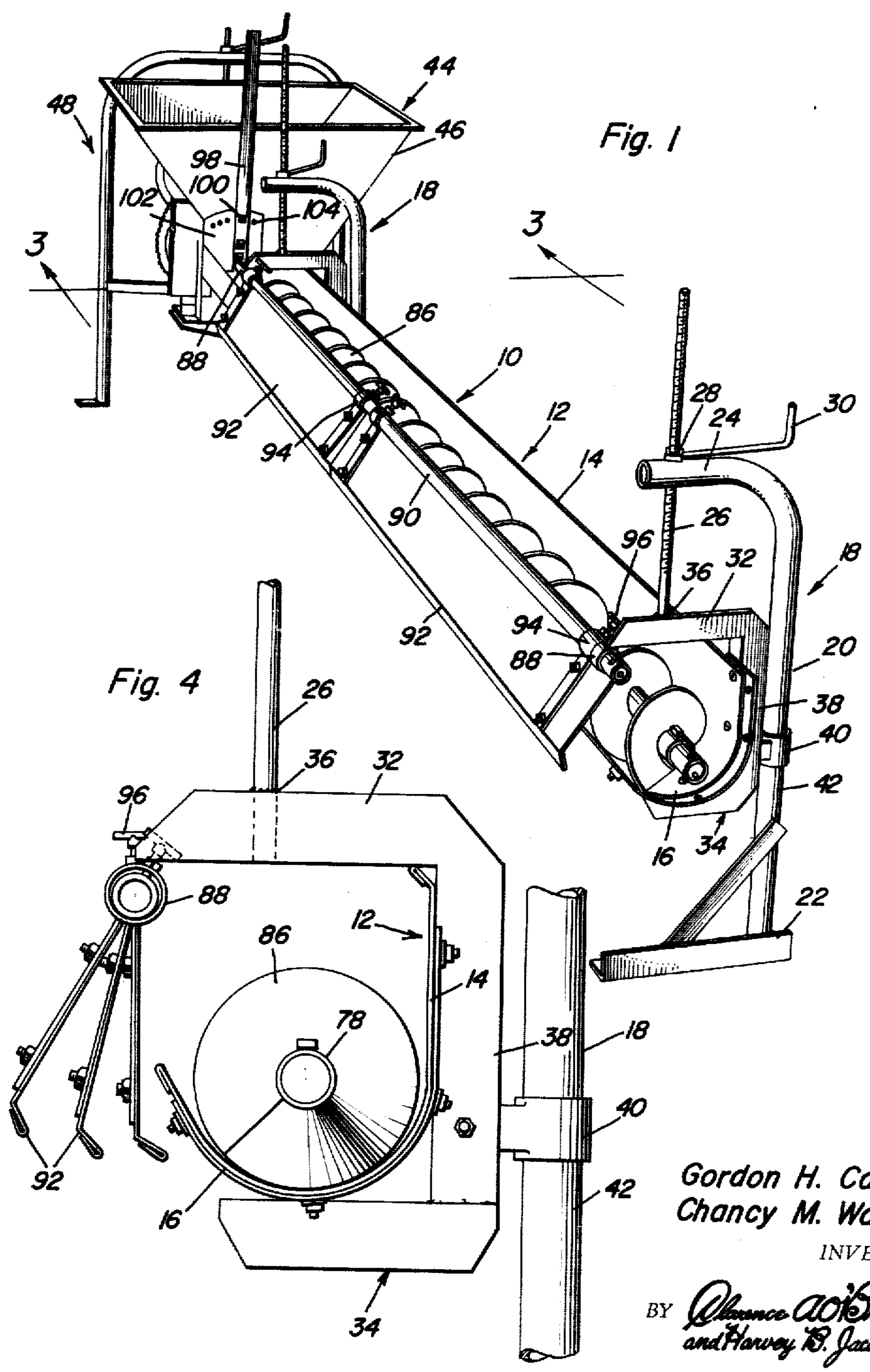
Gordon H. Carew
Chancy M. Walker
INVENTORS
BY Clarence A. O'Brien
and Harvey B. Jacobson
Attorneys ADJUSTABLE AUGER FEEDER
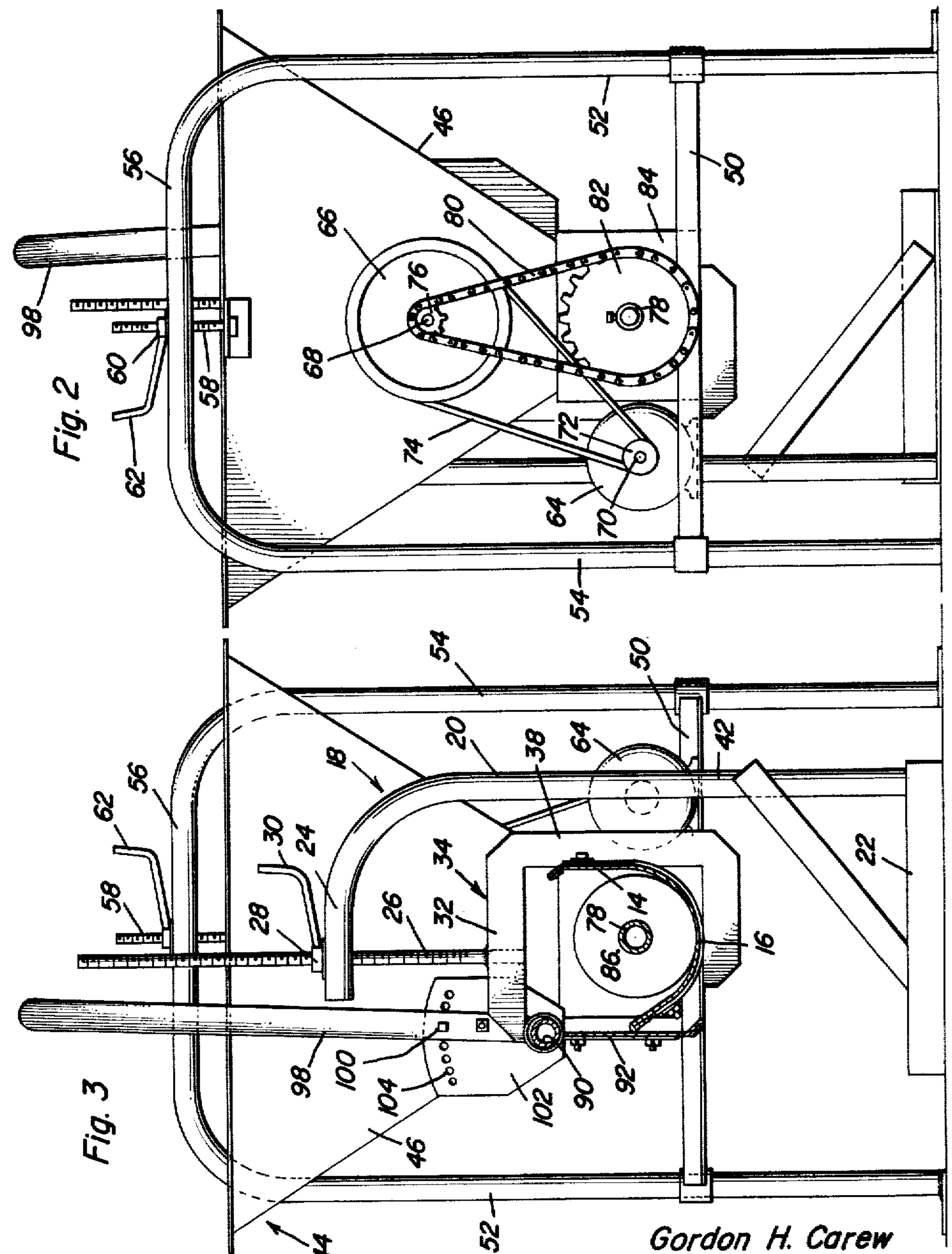
Gordon H. Carew
Chancy M. Walker
INVENTORS
BY Clarence A. O'Brien
and Harvey B. Jacobson
Attorneys ADJUSTABLE AUGER FEEDER
Filed Aug. 18, 1961 3 Sheets-Sheet 3
*Fig. 5*
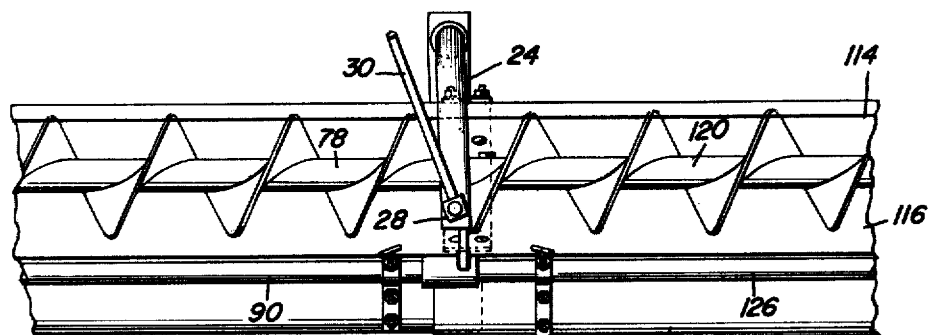
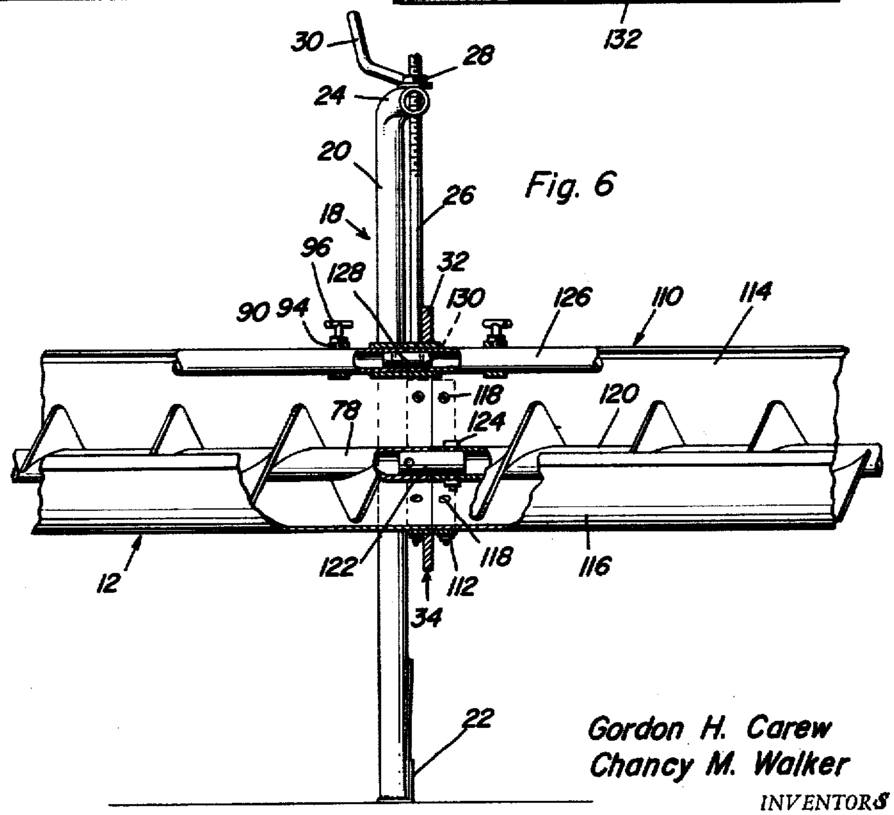
Gordon H. Carew
Chancy M. Walker
INVENTORS
BY Clarence A. O'Brien
and Harvey B. Jacobson
Attorneys United States Patent Office 3,105,586

Patented Oct. 1, 1963

3,105,586

ADJUSTABLE AUGER FEEDER

Gordon H. Carew and Chancy M. Walker, both of Manawa, Wis., assignors to Barn-O-Matic, Inc., New London, Wis., a corporation of Wisconsin Filed Aug. 18, 1961, Ser. No. 132,430

6 Claims. (Cl. 198—64)

This invention relates to a novel and useful type of adjustable auger feeder which is specifically adapted to provide an automatic extensively elongated feeder for distributing feed into feeding bunkers of great length.

Although the feeder of the instant invention has been specifically adapted to supply feed to feeding bunkers of great length, it is also particularly well adapted for supplying feed to relatively short feeding bunkers.

In providing a means for feeding large numbers of animals at a time heretofore the bunker type of feeders were provided with auger screws for dispensing feed from one end of a bunker type feeder throughout the entire length of the feeder. However, these previous auger screw assemblies have not been particularly well adapted to supply substantially equal quantities of feed simultaneously throughout the entire length of the bunker type of feeder. This resulted in one end of the feeder first being filled with feed and then the remainder of the feeder being filled with feed as the feed being distributed by the auger screw slowly fills the bunker feeder from the inlet end of the auger screw. These previous attempts at providing a means for distributing feed throughout the entire length of a bunker type of feeder resulted in one end of the bunker first being filled with feed and then the overflow or excess of feed being discharged to the next adjacent portion of the bunker feeder and so forth. Livestock therefore had a tendency to crowd at the point of initial discharge of the feed and thus greatly slow down the feeding process and resulted in only the more physically fit or stronger animals getting the proper amount of feed.

Accordingly, it is the main object of this invention to provide an auger type of feeder specifically adapted to simultaneously discharge substantially equal amounts of feed from the auger feeder into a bunker type of feeder disposed immediately therebeneath.

A further object of this invention is to provide an auger feeder which may be readily adjusted in vertical height above a supporting surface in order that the auger feeder may be aljustably positioned in elevation over a bunker type of feeder disposed immediately therebeneath.

Another object of this invention, in accordance with the preceding objects, is to provide an auger feeder constructed in a manner whereby it may readily be increased in length so as to provide a feeder that may be readily adapted to bunker type of feeders of varying length.

A final object to be specifically enumerated herein is to provide an auger feeder in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the auger feeder of the instant invention;

FIGURE 2 is an end elevational view of the auger feeder;

FIGURE 3 is a transverse vertical sectional view taken substantially upon the plane indicated by section line 3—3 of FIGURE 1 and on somewhat of an enlarged scale;

FIGURE 4 is a fragmentary enlarged end elevational view of the auger feeder as seen from the right side of FIGURE 1 and with the gate sections disposed in different rotated positions relative to each other;

FIGURE 5 is a top plan view of a portion of the auger feeder showing the manner in which a second auger feeder may be operatively connected thereto; and FIGURE 6 is a side elevational view of the assembly illustrated in FIGURE 5, parts thereof being broken away and shown in section.

Referring now more specifically to the drawings, the numeral 10 generally designates the auger feeder of the instant invention. The auger feeder comprises an elongated feeding trough generally referred to by the reference numeral 12 which is substantially J-shaped in cross section and includes one upstanding side wall 14 and a transversely concaved upwardly opening bottom wall 16.

The J-shaped trough 12 includes a plurality of support stands each referred to in general by the reference numeral 18 and including an inverted L-shaped upright member 20 having a base portion 22 at its lower end adapted to engage a supporting surface. The upper horizontal leg 24 slidably receives a screw shaft 26 and a threaded fastener 28 threadedly engaged with the screw shaft 26 and abuts the upper surface of the upper horizontal leg 24 for raising and lowering the screw shaft 26 upon swinging movement of the crank arm 30 carried by the fastener 28. The lower end of the screw shaft 26 is fixedly secured to the upper arm 32 of a generally C-shaped mount referred to in general by the reference numeral 34 in any convenient manner such as by welding 36. The bight portion 38 of the mount 34 includes a slide guide 40 which is slidably disposed on the upright leg 42 of the upright member 20. In this manner, each of the C-shaped members 34 may be raised and lowered relative to the base portions 22 of the support stands 18.

The inlet end of the trough 12 projects slightly beyond the adjacent support stand 18 and a hopper assembly generally referred to by the reference numeral 44 and including a hopper member 46 is positioned adjacent the inlet end of the trough 12 with the hopper member 46 positioned with its open lower end in registry with the inlet end of the trough 12. The hopper assembly 44 also includes a support stand which is referred to in general by the reference numeral 48 and the hopper member 46 includes a support brace 50 whose opposite ends are slidingly engaged with the upright legs 52 and 54 of the generally inverted U-shaped support stand 48. The upright legs 52 and 54 are interconnected by means of a generally horizontally disposed bight portion 56 at their upper ends and one end of a screw shaft 58 is supported from the hopper member 46 in any convenient manner and is slidingly received through the bight portion 56. A fastener 60 having a crank arm 62 secured thereto is threadedly engaged with the screw shaft 58 and disposed in abutting relation with the upper surface of the bight portion 56 whereby rotation of the fastener 60 will raise and lower the hopper member 46 and the support brace 50.

The support brace 50 has an electric motor 64 mounted thereon which is drivingly connected to an idler pulley 66 which is journalled on the hopper member 46 by means of shaft 68. The motor 64 includes an output shaft 70 which has a driving pulley 72 secured thereto and an endless flexible belt 74 is entrained over the driving pulley 72 and the idler pulley 66. A sprocket wheel 76 is secured to the shaft 68 and is drivingly connected to the auger screw shaft 78 by means of a chain 80 which is entrained over the gear wheel 76 and the gear wheel 82 secured to the auger screw shaft 78. The end of the auger shaft 78 is journalled for rotation in the support plate 84 which is also secured to the support brace 50. The auger screw shaft 78 has an auger feed screw 86 secured thereto and the auger feed screw 86 is cradled in the upwardly opening bottom wall 16.

A pair of journals 88 are carried by the free ends of the upper arms 32 of the standards 18 and rotatably journal a control shaft 90. The control shaft 90 has a plurality of gate sections 92 rotatably journalled thereon by means of pairs of supporting collars 94. Each gate section 92 includes at least one pair of support collars 94 and each support collar 94 has a setscrew 96 mounted thereon for engagement with the control shaft 90 whereby each gate section 92 may be secured in adjusted rotated position about the control shaft 90. A lever arm 98 is secured to the end of the control shaft 90 adjacent the hopper member 46 and includes detent means 100 disposed in frictional engagement with a selector plate 102 having detents 104 thereon selectively engageable by the detent means 100 for retaining the control shaft 90 in adjusted rotated position.

Thus, it may be observed that the control shaft 90 may be manipulated to simultaneously open and close the gate sections 92 which together form a discharge gate. Additionally, the gate sections 92 may be adjustably positioned relative to each other in order that the throat openings defined by the gate sections 92 may be varied throughout the length of the trough 12.

With attention now directed to FIGURES 5 and 6 of the drawings it will be noted that a second trough generally referred to by the reference numeral 110 may be supported at one end by means of the J-shaped brace 112 carried by the support stand 18 on the end of the trough 12 remote from the hopper assembly 44. The side and bottom walls 114 and 116 of the trough 110 may be secured to the J-shaped brace 112 by means of suitable fasteners 118 and cradled by means of the J-shaped brace 112. The adjacent ends of the auger shafts 78 and 120 are hollow and may be drivingly coupled together by means of an insert plug 122 having its opposite ends telescopingly received in the adjacent ends of the shafts 78 and 120. The insert plug 122 may be secured to the shafts 78 and 120 by means of any suitable fastener 124. Additionally, the control shaft 126 of the trough 110 is also hollow as is the adjacent end of the control shaft 90 and an insert plug 128 has its opposite ends secured in the confronting ends of the control shafts 90 and 126 in any convenient manner such as by fasteners 130. Therefore, the shaft 120 is drivingly coupled to the shaft 78 and the control shaft 126 is drivingly coupled to the control shaft 90. In addition, the end of the trough 116 adjacent the trough 12 may be vertically adjusted by means of the adjacent support stand 18. It is to be understood that the end of the trough 110 remote from the trough 12 is provided with a support stand (not shown) similar to support stand 18 and that the auger shaft 120 is rotatably cradled by means of the bottom wall 116 of the trough 110. Additionally, the trough 110 also includes a plurality of gate sections similar to gate sections 92 and supported by means of the control shaft 126. Accordingly, the gate sections 92 of the trough 12 and the gate sections 132 of the trough 110 may be adjustably positioned relative to the control shafts 90 and 126.

Any number of troughs may be secured in axial alignment with each other and have their control shafts operatively connected to the lever arm 98 and their auger screw shaft operatively connected to the motor 64. It will be noted that only the end of the auger shaft 78 adjacent the hopper assembly 44 is actually rotatably supported by a means other than the upwardly opening bottom wall 16 of the corresponding trough. Accordingly, each of the auger shafts drivingly coupled to the auger shaft 78 will be rotatably cradled solely by means of the corresponding bottom wall.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for distributing feed into feed bunkers comprising a source of bulk feed, an elongated trough extending therefrom, said trough having one upstanding wall and an open side, an auger cradled in said trough and supported at its outer end solely by said trough, a plurality of gates for closing selected sections of said open side, said gates being spaced longitudinally of said trough, and means connected to said gates and operable from a remote point for actuating said gates whereby substantially equal quantities of feed are discharged simultaneously therethrough over the open side of said trough.

2. An apparatus for distributing feed into feed bunkers comprising a source of bulk feed, an elongated trough extending therefrom, said trough having one upstanding wall and an open side, an auger cradled in said trough and supported at its end solely by said trough, gate means for closing selected sections of said open side, said means being spaced longitudinally of said trough, said means comprising a rotatable control shaft and separate side sections adjustably mounted thereon.

3. A bunk feeder comprising an elongated trough extending along and parallel to a feed bunker, said trough having an open side, an auger cradled therein and supported at its outer end solely by said trough, and adjustable gate means for partially closing portions of said open side along its length, and means for adjusting said gate means whereby substantially equal amounts of feed are simultaneously discharged from said trough through each of said gates over the open side of said trough.

4. A cattle feeding apparatus for distributing substantial equal quantities of feed throughout the length of a feed bunk comprising, in combination, an elongated trough having an open side, an auger cradled in said trough and supported at its outer end solely by said trough, a plurality of gates spaced along said open side for closing same, said gates being mounted directly above said open side for pivotal movement between open and closed positions, and remote means for controlling said gates.

5. A bunk feeder comprising a hopper, an elongated trough extending therefrom, said trough having an open side, an auger cradled therein and supported at its outer end solely by said trough, adjustable gate means for partially closing portions of said open side along its length, said gate means comprising a control shaft and gate sections adjustably mounted thereon for pivotal movement on rotation of said shaft.

6. A bunk feeder comprising a hopper, an elongated trough extending therefrom, said trough having an open side, an auger cradled therein and supported at its outer end solely by said trough, adjustable gate means for partially closing portions of said open side along its length, said gate means comprising a single control shaft extending longitudinally of said trough and gate sections adjustably mounted thereon for pivotal movement on rotation of said shaft.

References Cited in the file of this patent

UNITED STATES PATENTS

| | | |
|---|---|---|
| 1,027,432 | Prinz | May 28, 1912 |
| 2,067,583 | Stark | Jan. 12, 1937 |
| 2,176,092 | Meduna | Oct. 17, 1939 |
| 2,613,799 | Bawden et al. | Oct. 14, 1952 |
| 2,842,258 | Rupp et al. | July 8, 1958 |
| 2,867,314 | Hansen | Jan. 6, 1959 |
| 2,961,126 | Craig | Nov. 22, 1960 |
| 3,051,294 | Reed | Aug. 28, 1962 |

FOREIGN PATENTS

| | | |
|---|---|---|
| 216,804 | Australia | Apr. 3, 1958 |

UNITED STATES PATENT OFFICE

CERTIFICATE OF CORRECTION

Patent No. 3,105,586 October 1, 1963

Gordon H. Carew et al.

It is hereby certified that error appears in the above numbered patent requiring correction and that the said Letters Patent should read as corrected below.

Column 1, line 48, for "aljustably" read -- adjustably --; column 4, line 42, before "end" insert -- outer --.

Signed and sealed this 14th day of April 1964.

(SEAL)
Attest:
ERNEST W. SWIDER EDWARD J. BRENNER

Attesting Officer Commissioner of Patents